United States Patent
Deeba et al.

[11] Patent Number: 6,105,365
[45] Date of Patent: *Aug. 22, 2000

[54] APPARATUS, METHOD, AND SYSTEM FOR CONCENTRATING ADSORBABLE POLLUTANTS AND ABATEMENT THEREOF

[75] Inventors: Michel Deeba, North Brunswick; John K. Hochmuth, Bridgewater, both of N.J.

[73] Assignee: Engelhard Corporation, Iselin, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/833,700

[22] Filed: Apr. 8, 1997

[51] Int. Cl.⁷ ...................................................... F01N 3/00
[52] U.S. Cl. ................................ 60/274; 60/287; 60/288; 60/303; 60/295
[58] Field of Search ............................. 60/274, 287, 288, 60/301, 303, 311, 295, 297

[56] References Cited

U.S. PATENT DOCUMENTS

| | | | |
|---|---|---|---|
| 5,085,049 | 2/1992 | Rim et al. ................................. | 60/289 |
| 5,264,186 | 11/1993 | Harada et al. ........................... | 422/171 |
| 5,365,734 | 11/1994 | Takeshima ................................ | 60/288 |
| 5,388,406 | 2/1995 | Takeshima et al. . | |
| 5,406,790 | 4/1995 | Hirota et al. ............................. | 60/276 |
| 5,457,958 | 10/1995 | Boegner et al. ......................... | 60/297 |
| 5,603,216 | 2/1997 | Guile et al. .............................. | 60/288 |
| 5,697,211 | 12/1997 | Kawaguchi . | |
| 5,910,097 | 6/1999 | Boegner et al. ......................... | 60/278 |
| 5,937,637 | 8/1999 | Fujishita et al. ......................... | 60/274 |

FOREIGN PATENT DOCUMENTS

| | | |
|---|---|---|
| 0 540 280 A1 | 5/1993 | European Pat. Off. . |
| 0 562 805 A1 | 9/1993 | European Pat. Off. . |
| 0 702 134 A2 | 9/1994 | European Pat. Off. . |
| 0 718 476 A1 | 12/1994 | European Pat. Off. . |
| 43 42 062 A1 | 6/1994 | Germany . |
| 196 26 826 A1 | 1/1997 | Germany . |

*Primary Examiner*—Thomas Denion
*Assistant Examiner*—Binh Tran
*Attorney, Agent, or Firm*—Stephen I. Miller

[57] ABSTRACT

A new method, system, and apparatus are described for the adsorption and concentration of adsorbable pollutants. The invention allows for simultaneous pollutant adsorption and pollutant concentration. The invention is particularly useful in treating the exhaust of internal combustion engines containing adsorbable pollutants which can be concentrated and then treated to form harmless effluents.

18 Claims, 10 Drawing Sheets

APPARATUS, METHOD, AND SYSTEM FOR CONCENTRATING ADSORBABLE POLLUTANTS AND ABATEMENT THEREOF

BACKGROUND OF THE INVENTION

1. Field of the Invention

The present invention is broadly concerned with abatement of pollutants, particularly with adsorbable pollutant concentration in gaseous streams. More specifically, the present invention is concerned with a novel apparatus, method, and system for concentrating adsorbable pollutants (such as NOx and SOx) present in the exhaust stream of internal combustion engines (gasoline or diesel) comprising at least two adsorbable pollutant adsorption means (trapping materials) capable of operating simultaneously and in parallel to adsorb and concentrate the pollutants. The concentrated pollutants then may be further treated to form nonpolluting effluents.

2. Related Art

It is well known in the art of internal combustion engine exhaust treatment to utilize catalyst compositions such as those commonly referred to as three way conversion (TWC) catalysts. Such catalysts have been found to successfully promote both oxidation of unburned hydrocarbons (HC) and carbon monoxide (CO) and the reduction of NOx in the exhaust gas, provided that the engine is operated at or close to stoichiometric air/fuel conditions. However, many present day engines, especially gasoline-fueled engines used for passenger automobiles and the like, are designed not to operate at stoichiometric air/fuel conditions at least part of time as a fuel economy measure. In such lean-operating engines, the ratio of air to fuel in the combustion mixture supplied to the engine is maintained above the stoichiometric ratio so that the resulting exhaust gases are "lean", i.e., the exhaust gases are relatively high in oxygen (5–10% $O_2$) content and relatively low in reductants content, e.g., HC, CO, and/or hydrogen.

Although lean-burn engines provide enhanced fuel economy, a disadvantage is that conventional TWC catalysts cannot adequately abate the NOx component of the pollutants in the gas stream because high NOx conversion rates require reductant-rich conditions. The art has devoted great effort to treat the exhaust of lean-burn engines. The best catalysts known to abate NOx from engines under lean-burn conditions are those containing platinum. However, these catalysts have limitations of only reducing about 20 to 40% of the NOx in the exhaust mainly to $N_2O$ over a relatively narrow temperature range of 200–275° C. Another disadvantage of such catalysts is the high oxidation activity of $SO_2$ to sulfate under lean-burn conditions.

Other efforts to reduce NOx in lean-burn engines include combinations of TWC catalyst systems with NOx traps (sorbent materials). The NOx traps contain sorbent materials capable of adsorbing or "trapping" oxides of nitrogen and sulfur under lean conditions. The trapped oxides are desorbed and reduced under fuel-rich conditions thereby regenerating the traps. Therefore, it has been proposed that these so called NOx traps be utilized in what is called a "partial lean-burn" operating strategy. Here, the vehicle operates lean under some driving conditions and is controlled at the stoichiometric air-to-fuel (A/F or λ) ratio under other driving conditions. While operating lean, the engine is periodically subjected to rich fuel or reductant spikes to desorb and reduce NOx and regenerate the trapping function. The problem with this operating mode is that the vehicle cannot take full advantage of the fuel economy gains obtained under full-lean burn operating conditions because the engine operates lean only a fraction of the time. In addition, the rich spikes result in significant fuel economy losses because a significant amount of reductant is required to create a rich condition in the exhaust. Therefore, the gains obtained from the lean operating modes are less than 100%.

U.S. Pat. No. 5,365,734 to Takeshima discloses an apparatus having at least two lean NOx catalysts installed in parallel in the exhaust gas system of an internal combustion engine. The apparatus has means for changing the space velocity of the exhaust gas to each of the catalysts such that when the space velocity through one catalyst is high, the space velocity through the other catalyst is low. It is stated that by alternating the exhaust gas between high and low space velocities across the NOx catalyst, improved NOx catalysis is achievable. The NOx catalyst is said to be an ion-exchanged transition metal/zeolite catalyst. Examples of transition metals given are copper and cobalt. However, the patent is silent with regards to means for adsorbing adsorbable pollutants such as NOx and SOx to provide a concentrated pollutant-containing stream.

The present invention provides an advance over the related art by providing a novel adsorbable pollutant concentration solution as described herein.

SUMMARY OF THE INVENTION

The present invention provides an apparatus, method, and system for adsorbable pollutant concentration. The apparatus comprises:

(a) an inlet conduit for receiving gases containing adsorbable pollutants;

(b) means for separating and controlling the gases from said inlet conduit between at least a first conduit and a second conduit;

(c) a first pollutant adsorption means in fluid communication with said first conduit, said first means having inlet and outlet conduits; and (d) a second pollutant adsorption means in fluid communication with said second conduit, said second means having inlet and outlet conduits.

Further embodiments of the apparatus include combining the adsorption means with catalytic means for further treatment of the adsorbable pollutants and other pollutants that may be present.

In practicing the method and system of the present invention, the pollutant adsorption means cycle between a high-flow, adsorbing (trapping) mode and a low-flow, concentration (regeneration) mode. The amount of exhaust gas flowing to each of the adsorption means is controlled by separator means. The separator means is not required to close and thus provides means to continuously adsorb and concentrate the pollutants from the exhaust gas. Relative amounts of gas flow in the high-flow mode and the low-flow mode are discussed further herein. At some point in time during the low-flow condition, adsorbed pollutants are released from the adsorbent to form a concentrated pollutant-containing stream. In the embodiment where the adsorbable pollutant is NOx and the adsorbent is full, fuel reductant is added to the exhaust flow to produce a rich air-to-fuel (A/F) ratio at the NOx adsorbent thereby regenerating the adsorbing function. It is important to note that the addition of reductant may not be required over the entire duration of the low-flow condition. That is, reductant is added only during the low-flow (regeneration) mode to change the A/F ratio of the regeneration flow from lean to rich.

Some of the advantages of the present invention when applied to gasoline or diesel engine operation are:

1. The engine can operate lean at all driving conditions to take complete advantage of lean fuel economy gains.
2. The injection of fuel to regenerate the trap is only a small volume of that required compared with other known lean-burn modes where fuel is injected into the full air or exhaust flow of the engine.
3. This invention is complemented from the use of conventional TWC catalysts for abating NOx and other pollutants. TWC catalysts are well developed and can give more than 90% NOx conversion to $N_2$.
4. The use of a separator means that allows different proportions of exhaust to pass through either of the adsorption means has great economical benefits. One major benefit is that the gas being used in the regeneration cycle is significantly lower in oxygen content (5–7%) than ambient air (21%) and thus requires less fuel to transform the gas from a lean to rich condition in order to accomplish regeneration of the adsorption means.

DETAILED DESCRIPTION OF PREFERRED EMBODIMENTS

The apparatus, method, and system of the present invention relate to improved pollutant abatement systems. The present invention will become apparent from the following definitions and by reference to the accompanying figures.

For purposes of this invention, adsorbable pollutants are pollutants capable of being adsorbed onto a sorbent material. Examples of such pollutants are NOx (predominantly nitric oxide and nitrogen dioxide), and SOx (predominately sulfur dioxide and sulfur trioxide).

The following are definitions of terms useful in understanding the present invention:

Stoichiometric ratio—The mass of air (or oxygen) required to completely burn a unit mass of fuel to carbon dioxide and water with no oxygen left over.

Lean-burn condition—A condition where the amount of air (or oxygen) is greater than the stoichiometric ratio.

Rich-burn condition—A condition where the amount of air (or oxygen) is less than the stoichiometric amount.

Lambda Ratio ($\lambda$)—The ratio of the actual air-to-fuel (A/F) ratio to the stoichiometric air-to-fuel ratio.

When $\lambda>1$, this refers to a lean condition, when $\lambda<1$, this refers to a rich condition.

Also the terms "adsorbable", "adsorbent", "adsorption", etc., are intended to encompass both adsorption and absorption as these terms are generally known to persons skilled in the art.

Figure 1:
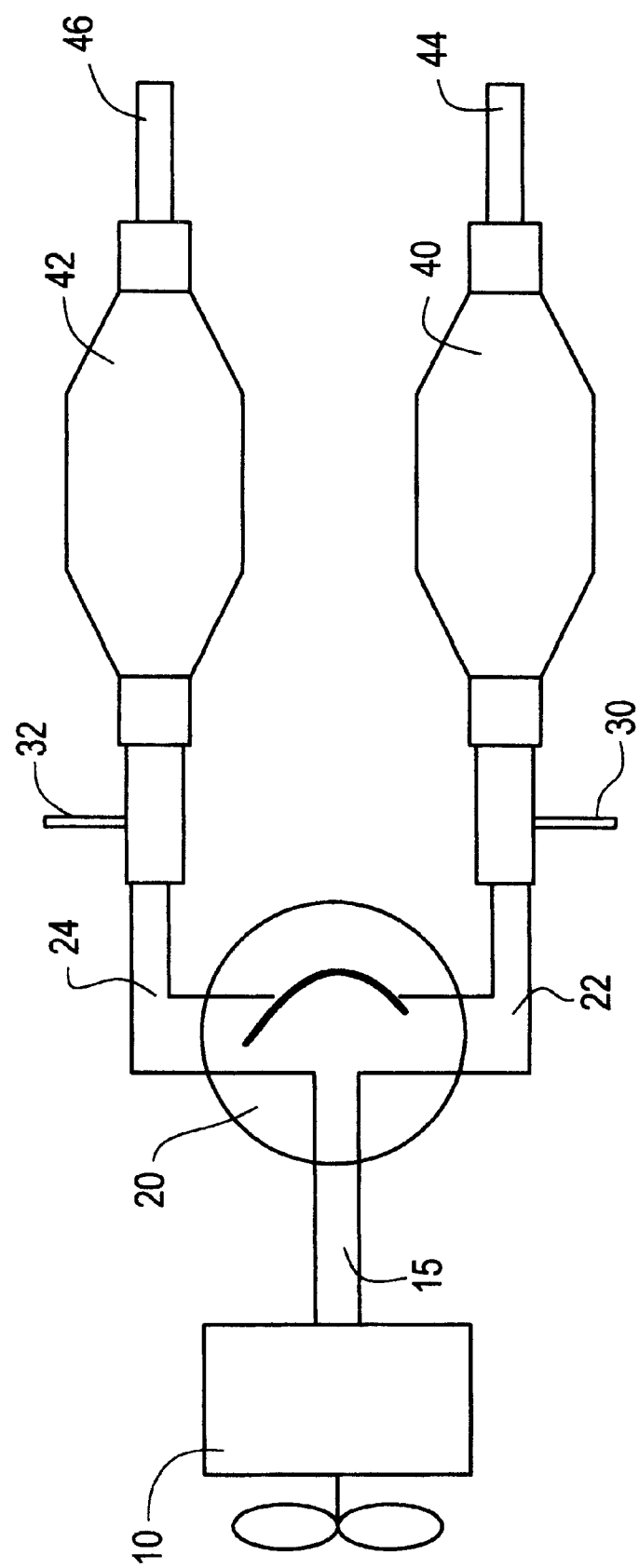
FIG. 1 shows one embodiment of this invention's apparatus.

FIG. 1 shows a preferred embodiment of the present invention in conjunction with the exhaust conduit 15 of an engine 10. The conduit 15 connects to a means for separating 20 conduit 15 into conduit 22 and conduit 24. Conduit 22 enters a first means for pollutant adsorption 40. First pollutant adsorption means 40 contains an outlet conduit 44 and means for injecting a reductant 30. Conduit 24 enters a second means for pollution adsorption 42. Second pollutant adsorption means 42 contains an outlet conduit 46 and means for injecting a reductant 32. It should be noted that the reductant injection means 30 and 32 are optional as reductant can enter the apparatus by other means such as through modification of engine 10 operation to temporarily provide a rich fuel spike to facilitate desorption of the pollutant in pollutant adsorption means 40 and 42. Alternately, desorption may occur through use of heating source capable of raising the adsorbent material in the adsorption means to a temperature hot enough to facilitate desorption of the pollutant. Such a heating source may comprise a heating element or comprise the heat generated from the combustion of a fuel. An example of a useful heating element is one typically used for heating catalysts, i.e., an electrically heated catalyst (EHC), which may conveniently be embedded in the adsorbent material.

It should be noted that in some instances it may be necessary to heat the adsorbent material to a minimum temperature sufficient to activate the adsorbency function of the adsorbent material. In such instances, the heating source whether an electrical heating element or heat generated by fuel combustion may be used to heat the adsorbent bed to the necessary temperature.

Separating means 20 can comprise any number of devices capable of dividing the exhaust gas in conduit 15 into conduit 22 and conduit 24. Such devices include but are not limited to valves, flaps, orifices, and the like. A key feature of separating means is its ability to conveniently operate the adsorption of the adsorbable pollutant in one of the pollutant adsorption means (40 or 42) while also providing a means to regenerate the sorption material that already contains adsorbed pollutants in the other of the pollutant adsorption means (40 or 42). That is to say that while one of the pollutant adsorption means is being used to adsorb, for example, NOx or SOx, the other pollutant adsorption means is being regenerated.

In operation, separating means 20 divides the exhaust gas flow into a high-flow stream and a low-flow stream. The high-flow stream of the exhaust gas passes into one of the adsorption means for the adsorption of the pollutant. The low-flow stream of the exhaust gas passes into the other adsorption means for the regeneration mode. In the low-flow mode, a stoichiometric-rich condition is created by injection of a reductant to desorb the adsorbed pollutant forming a concentrated pollutant stream. Alternately, desorption and concentration of the pollutant in the low-flow mode is accomplished through use of a heating element in the adsorbent bed or through the heat of combustion of a fuel. Typically, the pollutant is desorbed when the adsorbent bed temperature reaches a temperature ranging from 400 to 800° C. to desorb NOx and ranging from 500 to 900° C. to desorb SOx.

Characteristically, separating means 20 should have a mechanism capable of alternating the high-flow condition and low-flow condition between pollutant adsorptive means 40 and 42. These mechanisms are know in the art and can be any simple controlling mechanism such as an electrically, hydraulically, or pneumatically (i.e., by positive pressure or by vacuum) activated solenoid.

The pollutant adsorption means 40 and 42 comprise an adsorption material. Other embodiments include adsorption means in combination with any suitable pollutant destroying catalyst system. A variety of arrangements of the catalyst and adsorption material can exist. Such arrangements include but are not limited to combinations of an adsorption material with a catalyst as an overlayer or as a separate catalyst behind the adsorption materials. Other arrangements include a catalyst with an adsorptive material as an overlayer or a homogeneous mixture of the adsorption material and catalyst.

Suitable adsorption materials include but are not limited to metal oxides, metal carbonates, metal hydroxides, and mixed metal oxides.

Suitable metals for the oxides, carbonates, and hydroxides include but are not limited to Group IA and Group IIA metals. Preferred of these metals are lithium, sodium, potassium, cesium, magnesium, calcium, strontium, and barium; most preferred are lithium, barium, and strontium. Other preferred metals are lanthanum and manganese.

Examples of useful metal oxides are strontium oxide (SrO), barium oxide (BaO), calcium oxide (CaO), cesium oxide ($Cs_2O$), lithium oxide (LiO), lanthanum oxide ($La_2O_3$), potassium oxide ($K_2O$), magnesium oxide (MgO), manganese oxide ($MnO_2$), and sodium oxide ($Na_2O$) Preferred are $MnO_2$, BaO, and SrO.

Examples of useful mixed oxides are $BaTiO_3$, $BaZrO_3$, $LaZrO_2$, MnO, $LaMnO_{x'}$ (where x' is an integer from 2 to 4) and perovskite and spinal type mixed oxides. Also useful are mixed oxides containing $La_2O_3$, $CeO_2$ with metal oxides such as $TiO_2$, $ZrO_2$, $MnO_2$, BaO, and SrO. Preferred mixed oxides are those containing $ZrO_2$, $MnO_2$, BaO, and SrO.

The adsorption capabilities of the foregoing adsorbent materials may be enhanced for certain pollutants by incorporating certain metals such as precious metals. A preferred metal is platinum (Pt).

The adsorption enhancing amount of the precious metal is any amount capable of enhancing or promoting adsorption of the pollutant on the adsorbent material. Typically, such amounts range from 5 to 150 $g/ft^3$, preferably from 20 to 100 $g/ft^3$.

Suitable catalyst systems include but are not limited to Pt, palladium (Pd), rhodium (Rh) and combinations thereof. Preferred are Pt, Pd, Pt/Rh mixtures and Pt/Pd/Rh mixtures, most preferred are Pt/Rh mixtures and Pt/Pd/Rh mixtures.

Reductant injection means 30 and 32 comprises any suitable device capable of homogeneously injecting a reductant species into streams 22 and 24.

Figure 2:
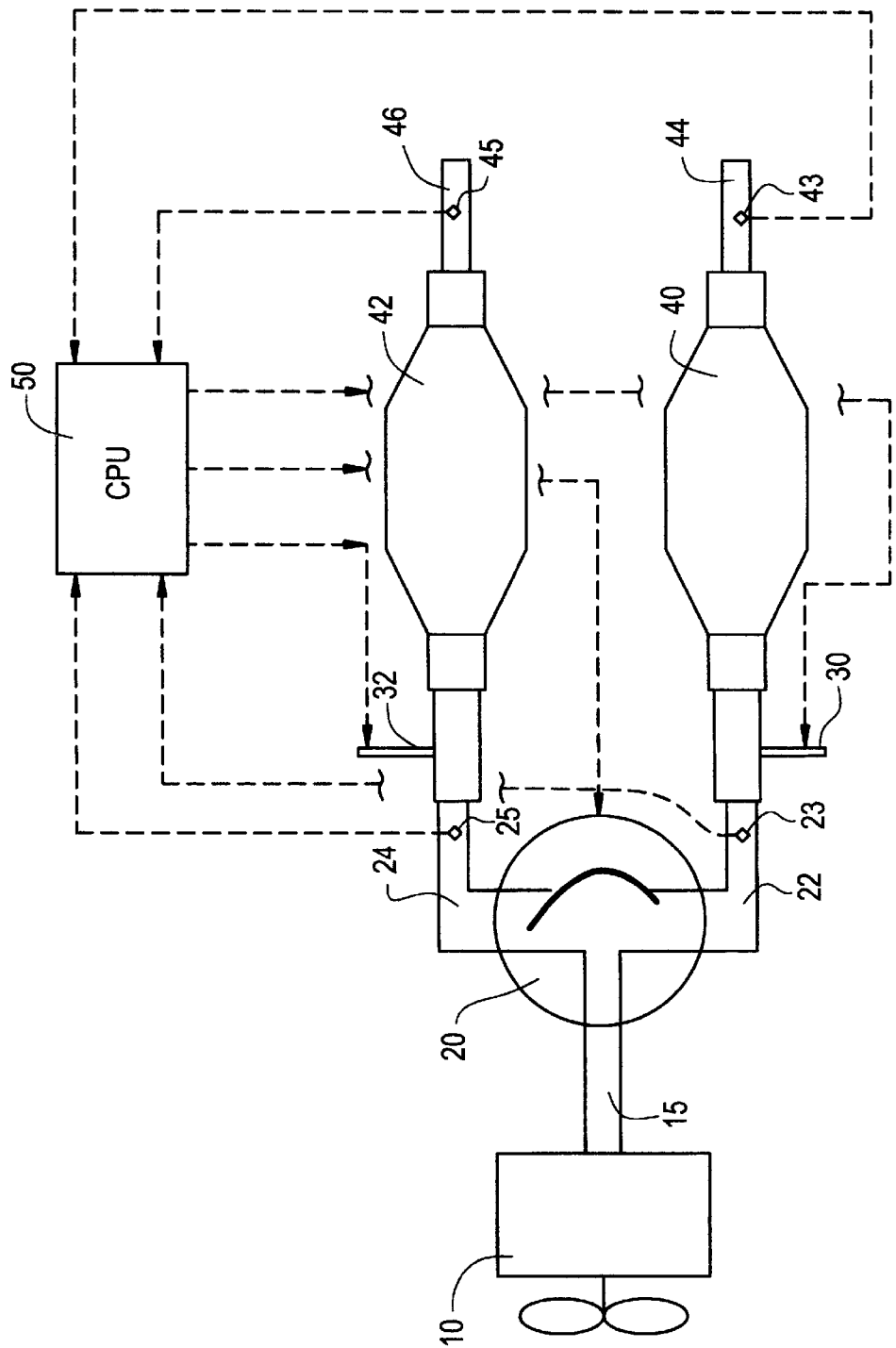
FIG. 2 shows a second embodiment, of this invention containing various sensor and control means.

FIG. 2 illustrates the apparatus of FIG. 1 further comprising oxygen sensors 23 and 25, NOx sensors 43 and 45, and a central processing unit (CPU) 50. CPU 50 is capable of receiving signals from the various sensors, processing them, and accordingly controlling the operation of separator means 20 and reductant injector means 30 and 32.

As will be apparent to one skilled in the art, the control of separator means 20 and injector means 30 and 32 can be achieved with all, some, or none of the signals generated by the various sensors. For example, control of separator means 20 and injector means 30 and 32 can be accomplished simply by a timer incorporated in CPU 50. In such a scenario, separator means 20 would be actuated to control the flow of gas exhaust 15 into streams 22 and 24 based on a pre-set timing sequence. The amount of reductant entering through injector means 30 and 32 may also be actuated through the timer. The operation of the timer would be based on such items as engine mapping and the estimated time it would take to effectively adsorb the estimated amount of NOx in the exhaust and regenerate the sorbent material. Furthermore, the timer could also be programmed to operate as a function of exhaust gas temperature and exhaust gas throughput.

For example, the amount of adsorbed NOx could be estimated from the engine air flow sensor coupled with previously developed engine maps for NOx content. When the estimated amount of absorbed NOx reaches a certain level, the flow rate can be decreased and a suitable amount of reductant injected to regenerate the trapping material and reduce the NOx to $N_2$.

Somewhat more sophisticated strategies may be used to control operation of the present invention through use of the various sensors. Examples of two control strategies follow the discussion explaining a typical detailed operating cycle of the present invention.

Typical Cycle for concentrating and abating pollutants in engine exhaust

The main exhaust gas pollutants entering the apparatus are HC, CO, and NOx. In the high-flow (adsorption) mode, approximately 51–99%, preferably 70–99%, most preferably 80–99% of the exhaust gas is directed by a valve or other appropriate separating means into a first adsorption means which contains a suitable adsorption material/TWC catalyst system. The amount of the HC and CO are abated at lean conditions by the TWC catalyst to give $CO_2$ and water. The NOx, on the other hand, is adsorbed by the trap. Simultaneously, while the first abatement means is in the high-flow mode, the remaining portion of the exhaust gas is directed to a second adsorption means containing a suitable adsorption material/TWC catalyst system. During this low-flow condition, the adsorption means is regenerated by injecting fuel in front of the adsorption means to change the air-to-fuel ratio from lean to rich. At rich conditions, the NOx is released and is reduced by the TWC catalyst. After a certain preset time (or as indicated by the NOx sensor or other appropriate control means), the valve switches the high-flow exhaust gas condition to the second adsorption means where HC and CO are abated and NOx is trapped. Simultaneously, the first abatement means is regenerated in the low-flow condition. Thus, NOx is continuously adsorbed in one of the adsorption means while adsorbed NOx is desorbed in the other adsorption means. The cycling strategy between the first and second adsorption means continues successively by operating the valve to provide purified exhaust streams. The engine is at lean A/F all the time.

It should be noted that reductant injection need not occur for the full duration of the low-flow condition. Also reductant injection can occur at any time during the low-flow condition. Preferably, injection occurs immediately after the adsorption means is switched to the low-flow condition. In this way, the adsorption means being regenerated is regenerated as soon as possible so that when reductant injection is ceased, the adsorption means will be able to adsorb any pollutants that are present in the low-flow stream. Also, reductant injection may be provided a second time at a point in time to insure the adsorption means is fully regenerated before being switched to the high-flow adsorption condition.

Control Strategies

The following detailed discussions on control strategies is not intended to be limiting on the various strategies that one skilled in the art may be able to apply to the apparatus of the present invention.

The basic objective of any control strategy is to alternate the high-flow condition and the low-flow condition between the first and second adsorption means as explained above. Thus, when one of the adsorption means becomes saturated or near the pollutant break-through point (i.e., the point when the adsorbent is no longer capable of effectively adsorbing the pollutant before the pollutant exits into the atmosphere) in the high-flow mode, a changeover is made so that the regenerated absorption means receives the high-flow stream and the saturated absorption means receives the low-flow stream, preferably initially injected with reductant, to begin regeneration of the saturated adsorbent means. The changeover is repeated to effectively prevent the pollutant from entering the atmosphere.

Thus, the basic requirements of the control strategy are to effectively predict or monitor the condition (i.e., saturated or regenerated) of the adsorption means. To accomplish this, the following tasks are performed to determine (i) the quantity of the pollutant (NOx or Sox) adsorbed on the adsorption means; (ii) when to switch the adsorber between the high-flow and low-flow conditions; (iii) the amount of reductant to inject; and (iv) when to turn the reductant off.

Figure 3:
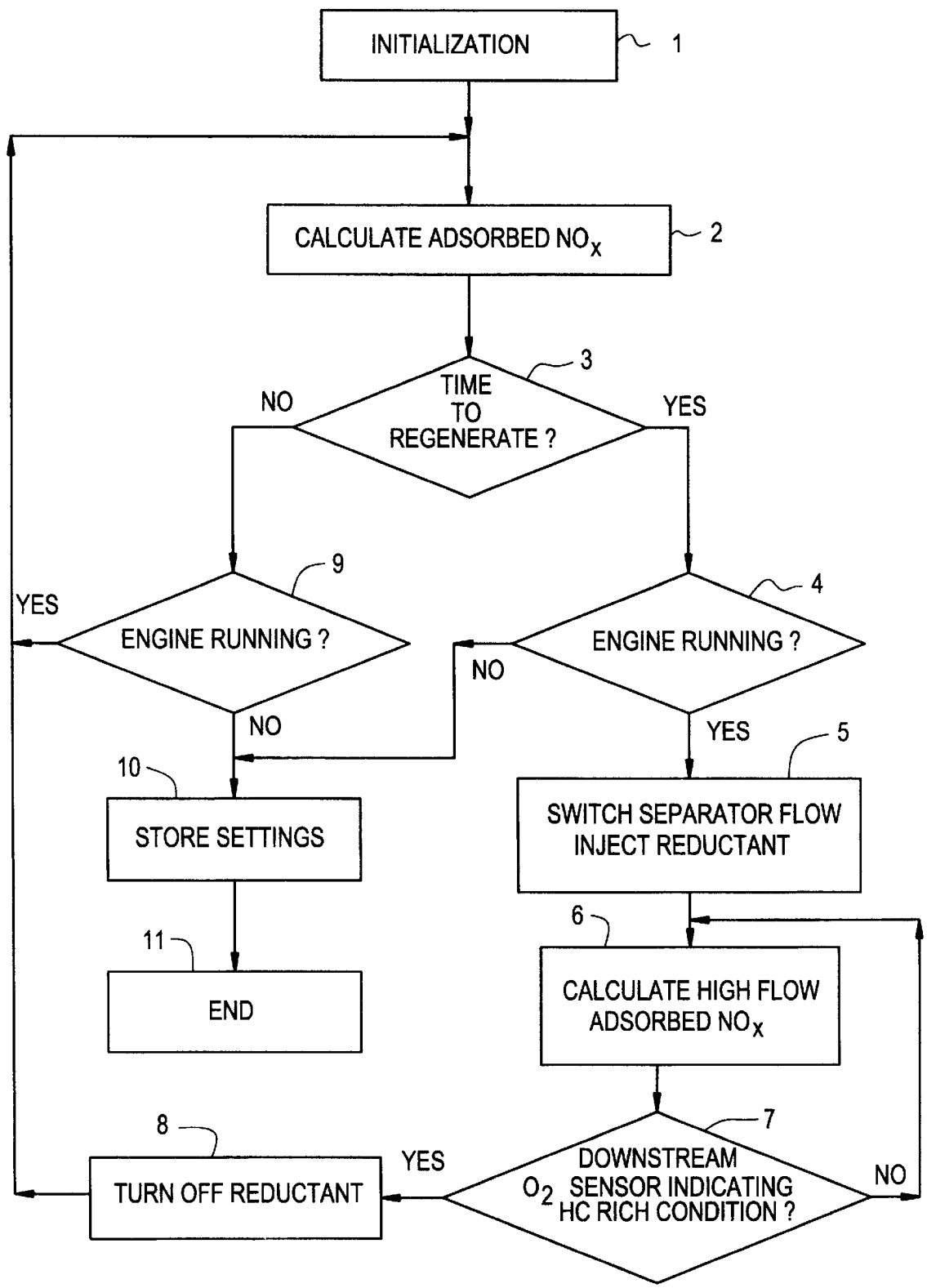
FIG. 3 depicts a generalized algorithm for controlling the apparatus of the invention.

FIG. 3 depicts a basic control algorithm showing boxes (1) to (11) containing short descriptions of typical steps for controlling the apparatus of the present invention. The control algorithm will be explained below for an embodiment wherein two $O_2$ or A/F sensors are used downstream from the adsorption means. It will be appreciated by one skilled in-the-art that the following descriptions are illustrative and not intended to be limitative of other control strategies or sensors useful in controlling the apparatus of the present invention.

Oxygen Sensor or A/F Sensor Algorithm

Initialization Box (1)—This box performs the following functions when an engine is turned on:

Check separator means (valve) flag—determines the valve position and assigns the two adsorption means as either the high-flow adsorber (e.g., Adsorber A) or the low-flow adsorber (e.g., Adsorber B). Valve position also determines the high-flow split fraction ("S") which is 0<S<1.

Initialize the calculated quantity of adsorbed NOx ("gNOx")—First time the engine is run $gNOx^{An}$= $gNOx^{Bn}$=0, otherwise $gNOx^{An}$ and $gNOx^{Bn}$ are equal to values stored in memory from the previous time the engine was running. "n" is an iteration indicator which is an integer equal to 0 when first started.

Initialize timer—used in calculating amount of NOx produced from engine.

Calculate Adsorbed NOx Box (2)—This box determines the amount of NOx adsorbed on Adsorbers A and B.

$$gNOx^{An+1}=gNOx^{An}+(\text{mass flow})*(EONOx)*\eta*S*\text{time} \quad [1]$$

$$gNOx^{Bn+1}=gNOx^{Bn}+(\text{mass flow})*(EONOx)*\eta*(1-S)*\text{time} \quad [2]$$

where:

$gNOx^{An+1}$=amount of adsorbed NOx in Adsorber A
$gNOx^{Bn+1}$=amount of adsorbed NOx in Adsorber B
$gNOx^{An}$=amount of NOx adsorbed in Adsorber A initially or from prior iteration
$gNOx^{Bn}$=amount of NOx adsorbed in Adsorber B initially or from prior iteration
mass flow=engine mass flow obtained from mass air sensor
EONOx=engine out NOx mass rate obtained from data table in an automobile's ("ECU") as function of engine speed and load (i.e., engine mapping)
$\eta$=adsorption efficiency obtained from data table in the ECU as function of engine speed and load
S=high-flow split fraction, 0<S<1
time=time spent at speed and load As these calculations are performed, the reductant injection at Adsorber B is activated. We presume the existence of a "pumping means" to introduce the reductant (here presumed to be fuel). The amount of fuel, or flow rate, injected can be predetermined for a given gNOx, with the data stored in another data table of the ECU. The reductant flow rate is injected until such time as the oxygen or A/F sensor detects that the stream exiting Adsorber B is going rich. (see Box 7) (The NOx that is adsorbed in Adsorber B acts as oxygen storage and so the downstream A/F will not become rich until all of this oxygen storage is used up.) Then, the reductant injection is deactivated and Adsorber B is allowed to start adsorbing NOx in the low-flow condition.

Time to Regenerate? Box (3)—Check that adsorbed NOx does not exceed adsorption capacity of the high-flow adsorber by a check of the inequality:

$$gNOx^{An+1}<maxNOx*Fs \quad [3]$$

where:

maxNOx=maximum amount of adsorbed NOx before regeneration is required
$F_s$=safety factor to accommodate transient fluctuations and interpolation between data table entries (<1.0)

If equation [3] is true, Adsorber A is not filled to its adsorption capacity and it is not time to regenerate and a signal is sent to Engine Running? (Box (9)). If the engine is running, then an iteration is concluded and new values for equations [1] and [2] are calculated at Box (2). If the engine is not running in Box (9), the engine is off, the values (settings) for $gNOx^{An+1}$, $gNOx^{Bn+1}$, and S are stored to be used as initial settings when the engine is turned back on. Once the settings are stored, the algorithm is exited (END Box (11)).

If equation [3] is not true, Adsorber A is near adsorption capacity. A check is made to see if the engine is running—Box (4).

Engine Running? Box (4)—If the engine is off, the settings are stored and the algorithm is exited as explained above. (Boxes (10) and (11)). If the engine is still running, go to Box (5).

Switch Separator Flow/Inject Reductant Box (5)—When adsorption capacity is nearly full, i.e., $$gNOx^{An+1} \geq maxNOx*Fs \quad [4]$$

a signal is sent to activate the flow separation means (valve) to direct the high-flow condition to Adsorber B and the low-flow condition to Adsorber A. The algorithm assigns $gNOx^{An+1}=gNOx^{Bn+1}$ and injects reductant based on an injection rate from a data table. All other settings/values are also exchanged relating to Adsorber A and Adsorber B such that the designation Adsorber A will refer to the high-flow case.

Calculate High Flow Adsorbed NOx Box (6)—Based on the newly exchanged values from Box 5, the amount of NOx adsorbed in Adsorber A (high-flow) is calculated by equation [1].

Downstream $O_2$/A/F Sensor Indicating HC Rich Condition? Box(7)—If a hydrocarbon-rich condition is indicated, the Adsorber B has been regenerated because reductant is breaking through and is no longer reducing NOx. Go to Box (8). If no reductant breakthrough detected, Adsorber B is not regenerated, go back to Box (6).

Turn Off Reductant/Set $gNOx^{Bn+1}=0$ Box (8)—When this point is reached, Adsorber B has been regenerated. Reductant injection is turned off and the amount of adsorbed NOx in Adsorber B is set to 0. ($gNOx^{Bn+1}=0$). Go back to Box (2) and repeat foregoing until engine turned off.

Engine Running? Boxes (4) and (9)—When engine is turned off, go to Box (10).

Store Settings Box 10—If engine is turned off, current settings are stored until the engine is turned back on and become the initial settings for the new engine running period. Go to Box (11).

End Box (11)—End of algorithm.

$NO_x$ Sensor Algorithm

This algorithm description also starts at the point where the separation means has been activated to direct the high-flow condition to Adsorber A to begin pollutant adsorption.

The algorithm for use with a NOx sensor is the same as in FIG. 3 and as described in the $O_2$/A/F sensor algorithm. The following description highlights the major differences. According to this embodiment, there are two NOx sensors and two $O_2$ sensors. Each type of sensor is placed downstream of Adsorber A and Adsorber B, respectively.

Calculate Adsorbed NOx Box (2)—This calculation is based on an estimate of the efficiency of NOx absorption in the adsorbers using the equations:

$$\eta calc^A = \{(EONOx)(S)-(TPNOx)^A\}/(EONOx)(S) \quad [1']$$

$$\eta calc^B = \{(EONOx)(1-S)-(TPNOx)^B\}/(EONOx)(1-S) \quad [2']$$

where:
- ηcalc=estimated efficiency of adsorbed NOx in indicated adsorber (A or B).
- EONOx=engine out $NO_x$ mass rate obtained from data table in ECU as function of engine speed and load.
- S=high-flow split fraction (0<S<1).
- TPNOx=tailpipe NOx mass rate obtained from NOx sensor at outlet of indicated adsorber (A or B).

Time to Regenerate? Box (3)—The decision to regenerate Adsorber A and switch the high-flow condition to Adsorber B is made by comparing Equation [1'] to a previously measured known efficiency that is stored in a data table or equation in the ECU. For example, previously measured efficiencies, ηEXP, could be stored in a speed load table. Alternatively, temperature could be stored in a speed load table with an equation that relates efficiency as a function of temperature, i.e.

$$\eta EXP = f(T) \quad [3']$$

Regardless of the method of data storage, the comparison is made for the condition:

$$\eta calc^A < \eta EXP \quad [4']$$

If equation [4'] is true, a regeneration is initiated.

Each time the engine operating condition changes, a new ηEXP value is obtained from the engine map and equations [1'] and [2'] are updated, and equation [4'] is checked. When equation [4'] is satisfied, a signal is sent to activate the flow separation means to direct the high-flow condition to Adsorber B and the low-flow condition to Adsorber A (i.e., go to Boxes (4) and (5) of algorithm). The algorithm as described before then reassigns the high-flow and low-flow functions such that Adsorber B is substituted for Adsorber A and Adsorber A is substituted for Adsorber B. In this way, Adsorber A will designate the high-flow condition adsorber and Adsorber B will designate the low-flow condition adsorber. All other algorithm steps are essentially the same as discussed for the $O_2$/A/F flow sensor algorithm.

Simulation of Invention and Examples

Figure 4:
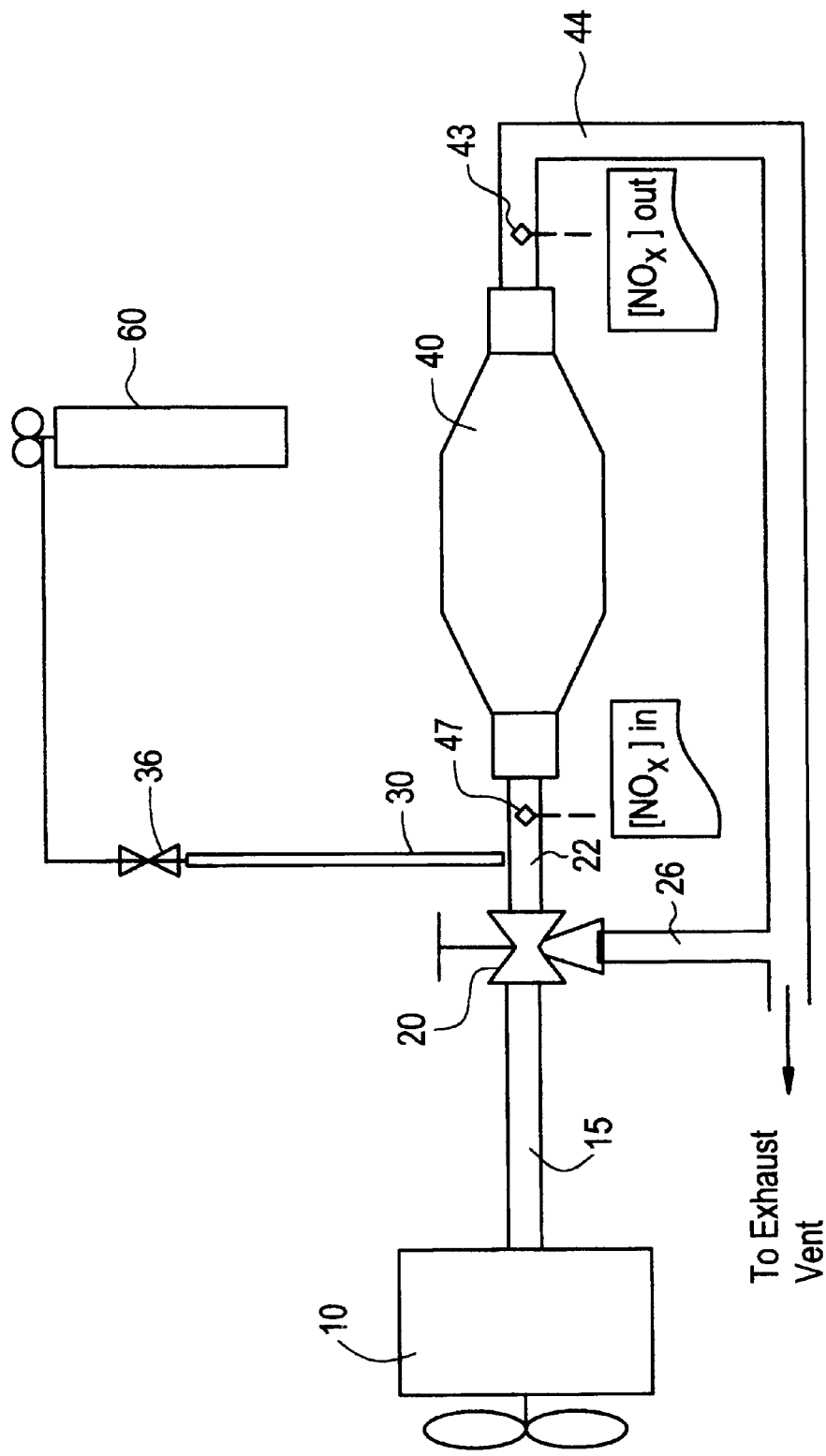
FIG. 4 illustrates the bench scale apparatus used to simulate the invention.

FIG. 4 illustrates a bench test apparatus used to simulate the invention by monitoring NOx conversion. All numbered elements are consistent with previous FIGS. 1 and 2. FIG. 4 additionally depicts a cylinder 60 for supplying reductant and a solenoid valve 36 for controlling the amount of reductant. Also NOx sensor 47 was added to measure the concentration of NOx entering adsorption means 40. In essence, FIG. 4 represents one side of this invention's pollutant concentration apparatus.

The type of engine used for the simulation was 8 cylinder, 4.6 L engine. The adsorbent material used was SrO homogenously mixed with catalyst of Pt/Rh on $Al_2O_3$. The operating condition of engine 10 was set to 2000 rpm at 16 in Hg vacuum. This gives a total exhaust flow of 42.9 SCFM. The A/F ratio of the engine was fixed at $\lambda \approx 1.28$. Separator means 20 was set so that in the "ON" (high-flow condition), ½ of flow 15 was directed to the adsorbent means and ½ was directed to the vent system. Under the high-flow condition, adsorption of NOx occurs. In the "OFF" position (low-flow condition), the separator means 20 was adjusted so that ⅛ of flow 15 was directed to the adsorption means and ⅞ of flow 15 was directed to the vent system. This simulates the system of the invention with a 4/1 flow split, i.e., having ¼ (25%) of flow 15 for regeneration flow. The reductant was delivered to the adsorption means during the low-flow period. The correct injection flow was adjusted by measuring the A/F ratio. Gas concentration of CO, $O_2$, HC and NOx were measured using the following conventional analyzers:

- Carbon Monoxide—Rosemount Model 880 Nondispersive Infrared Analyzer
- Hydrocarbon—Beckman Model 400A Flame Ionization Detector Analyzer
- Oxygen—Beckman Model OM1EA Paramaquetic Analyzer
- Nitrogen Oxides—Rosemount Model 951A Chemiluminescent Analyzer These measurements were used to calculate the A/F ratio as described in SAE 770365 in front of the adsorption means during the steady state low-flow condition. The target A/F ratio produced $\lambda \approx 0.9$ at the adsorption means inlet. Solenoid valve 36 was used to initiate and terminate the reductant flow. Pure carbon monoxide (>99.5%) and pure propylene (>99.0%) were supplied from cylinders for the simulation. The actual invention may employ injecting gasoline or diesel fuel as reductant depending on the application. In other applications, reductants including natural gas, urea, ammonia, cracked hydrocarbon gas and diesel could be used. The experiment was programmed in a manner which allowed variable injection time.

COMPARATIVE EXAMPLE, C-1

Figure 5:
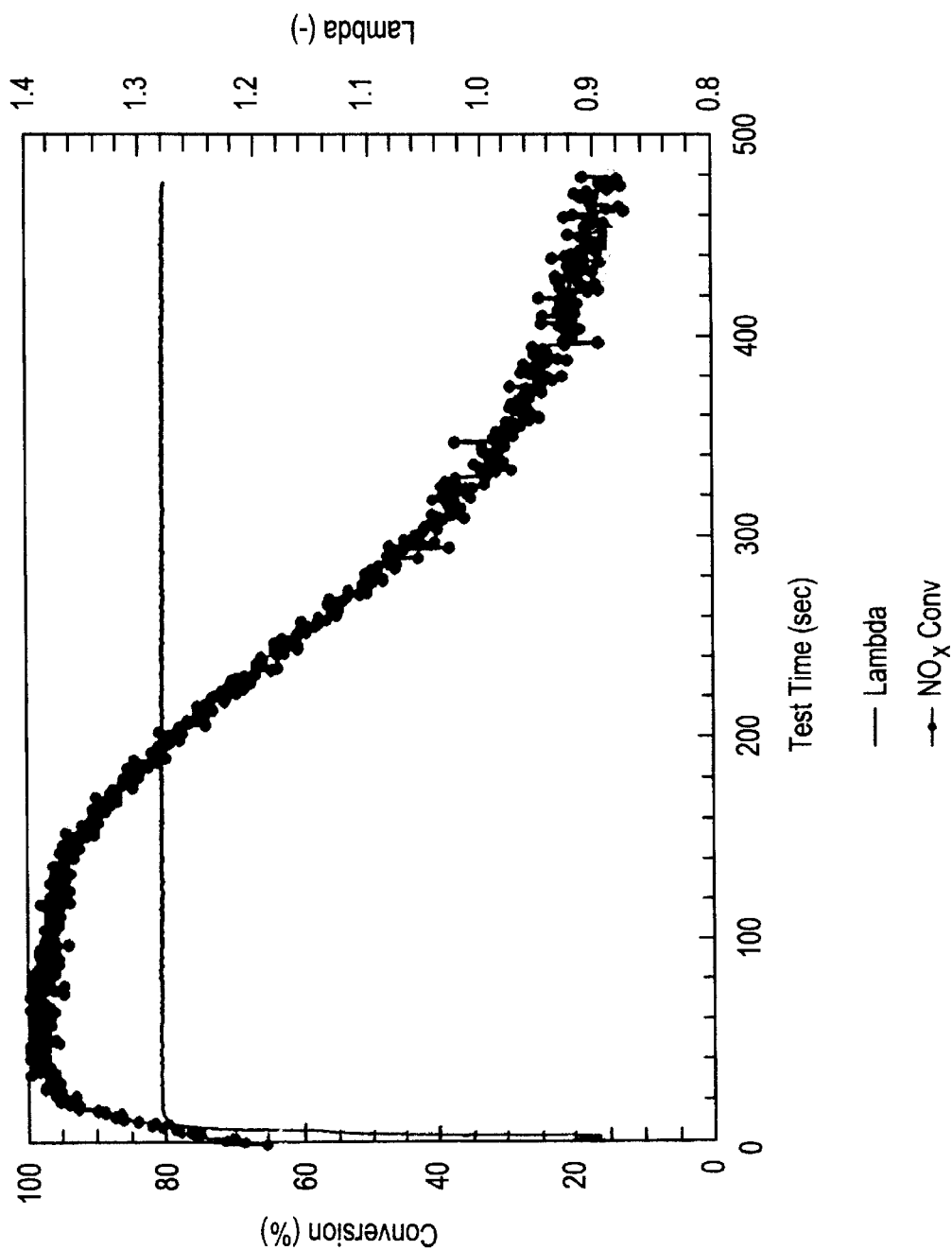
FIG. 5 illustrates NOx conversion for comparative example, C-1.

The adsorption means was regenerated with a flow of rich exhaust gas by injecting reductant during the low-flow condition. The separator means 20 was switched to the high-flow condition with the engine continuously operated at $\lambda\approx1.28$. The NOx concentration was monitored at the inlet and exit of the adsorption means by the above-described analyzers. The "NOx Conversion" as a function of time is shown in FIG. 5. "NOx Conversion" is defined as follows:

$$NOx\ Conversion = \frac{[NOx]in - [NOx]out}{[NOx]in} \times 100$$

As shown in FIG. 5, the NOx conversion is very high initially. As the trapping agent fills up, however, the performance degrades very quickly and, after about three minutes, falls precipitously toward zero.

COMPARATIVE EXAMPLE, C-2

The NOx trap was run in a "Partial Lean Burn" mode. At the start of the experiment, the engine was set at 2000 rpm and 16 inches Hg vacuum with separator means 20 set to give ½ the total flow. Initially, the engine A/F ratio was set at the stoichiometric point $\lambda\approx1$.

Figure 6:
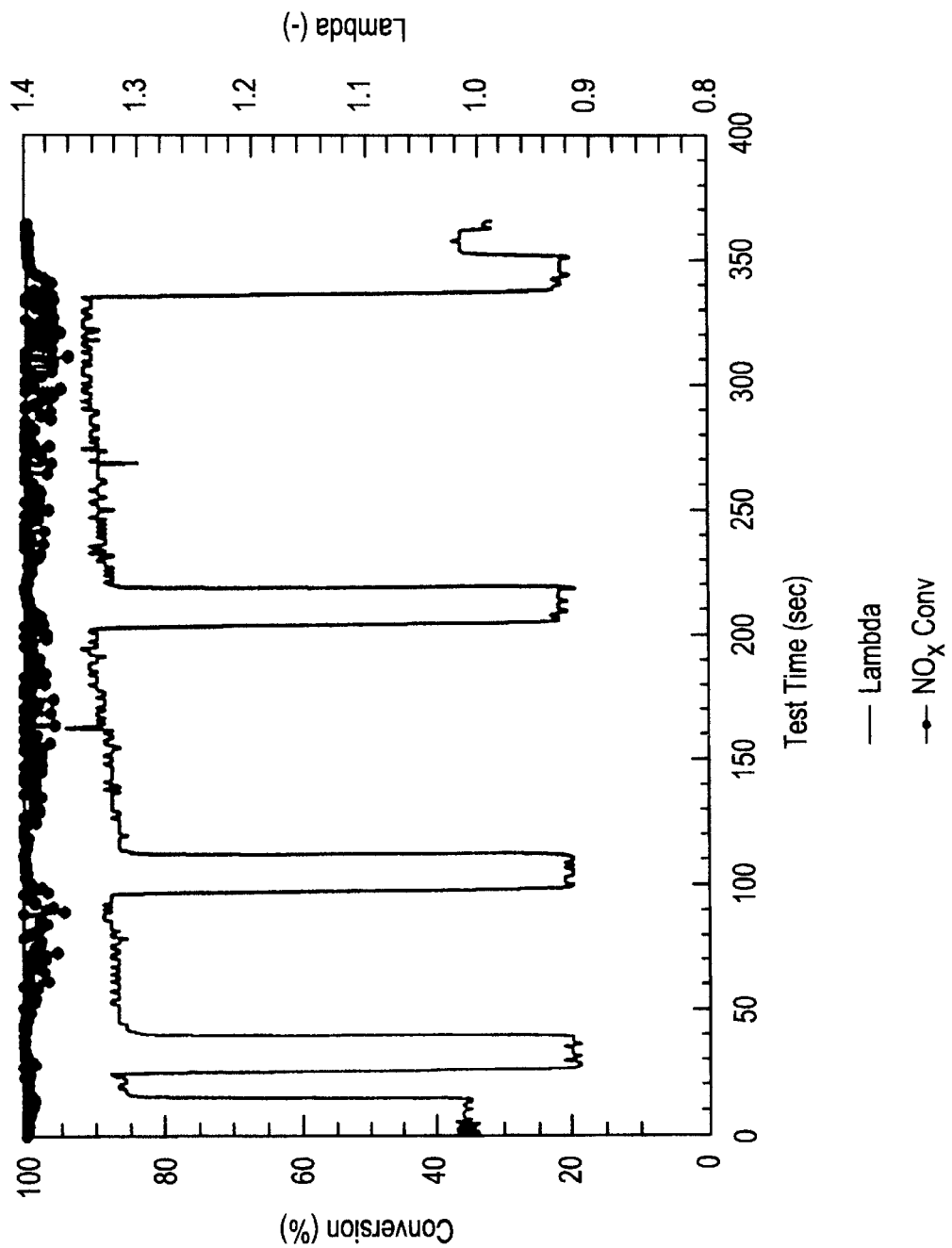
FIG. 6 illustrates NOx conversion for comparative example, C-2.

The engine A/F ratio was controlled to cycle between $\lambda\approx1.3$ and $\lambda\approx0.9$ with the lean cycle increased from 10 sec to 60 sec, to 90 sec, and finally to 120 sec and the rich cycle was maintained always at 15 sec. The results are shown in FIG. 6. It can be seen that the NOx conversion remains high throughout the test. The cost of obtaining that performance is in the fuel required to reduce the A/F ratio in the engine to $\lambda\approx0.9$.

INVENTIVE EXAMPLE, I-1

Figure 7:
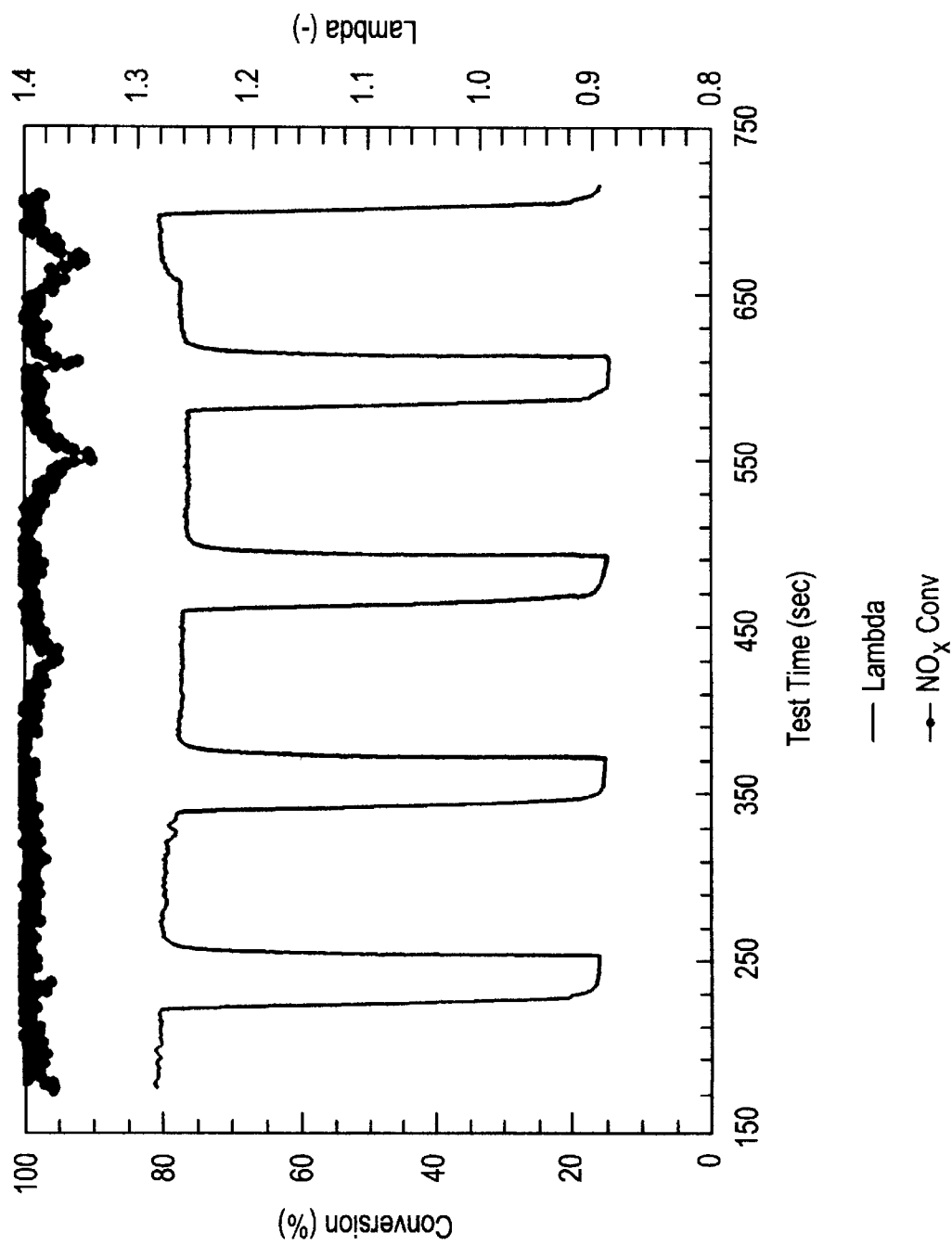
FIG. 7 illustrates NOx conversion for inventive example, I-1.

The invention was simulated with a 29 second injection of carbon monoxide initiated at the low-flow changeover. The adsorption means was exposed to 60 seconds of high-flow and then the diverter valve was switched to the low-flow condition. At 31 seconds into the low-flow condition, the carbon monoxide injection was initiated for 29 seconds. Then the carbon monoxide injection was terminated and the diverter valve switched to the high-flow condition. This cycle was repeated continuously for approximately 20 minutes. A segment of the test is shown in FIG. 7.

INVENTIVE EXAMPLE, I-2

Figure 8:
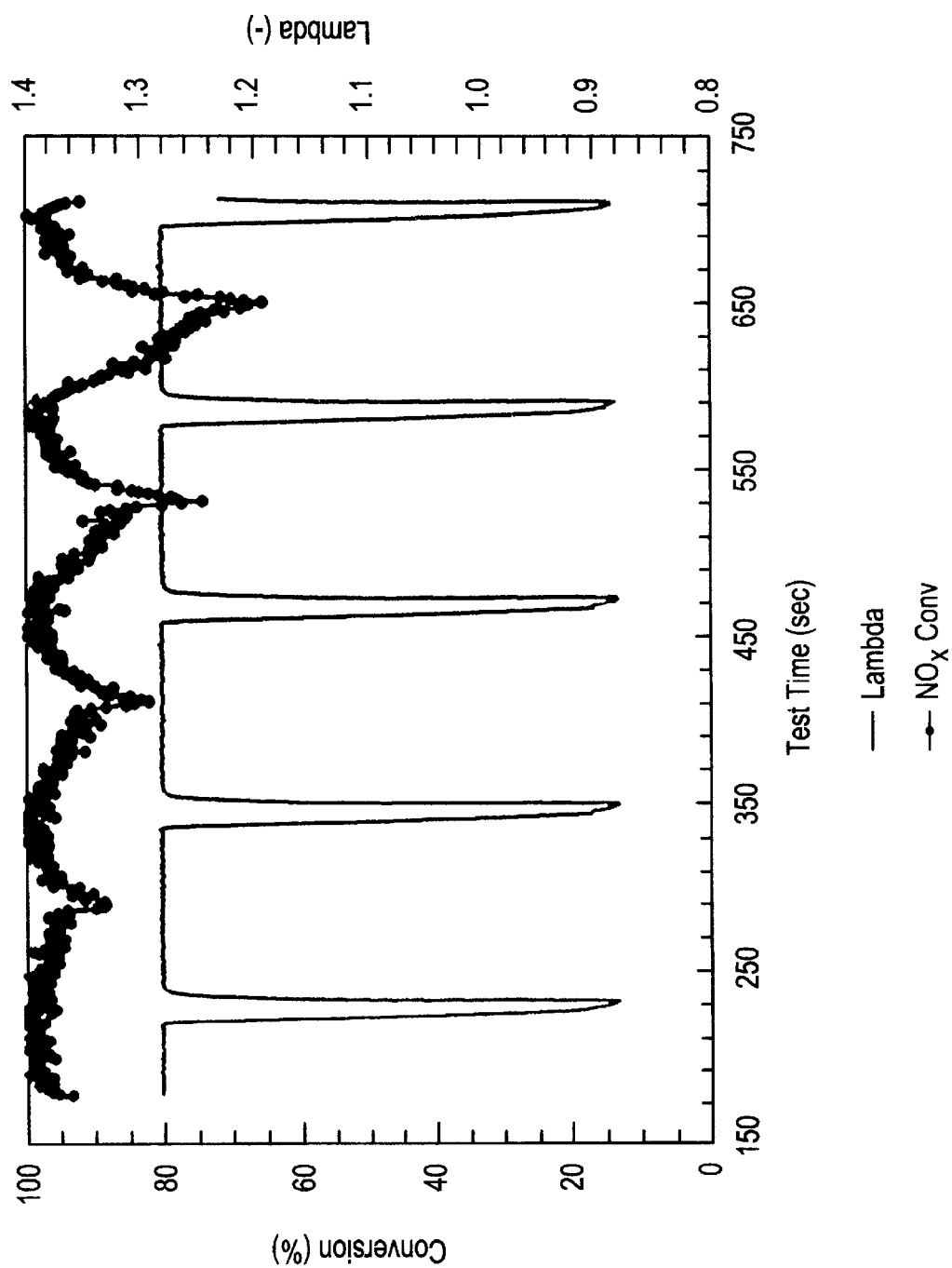
FIG. 8 illustrates NOx conversion for inventive example, I-2.

The invention was simulated as in example I-1, but with only a 10 second injection of carbon monoxide. The cycle was repeated for over 15 minutes. A segment of the test is shown in FIG. 8.

INVENTIVE EXAMPLE, I-3

Figure 9:
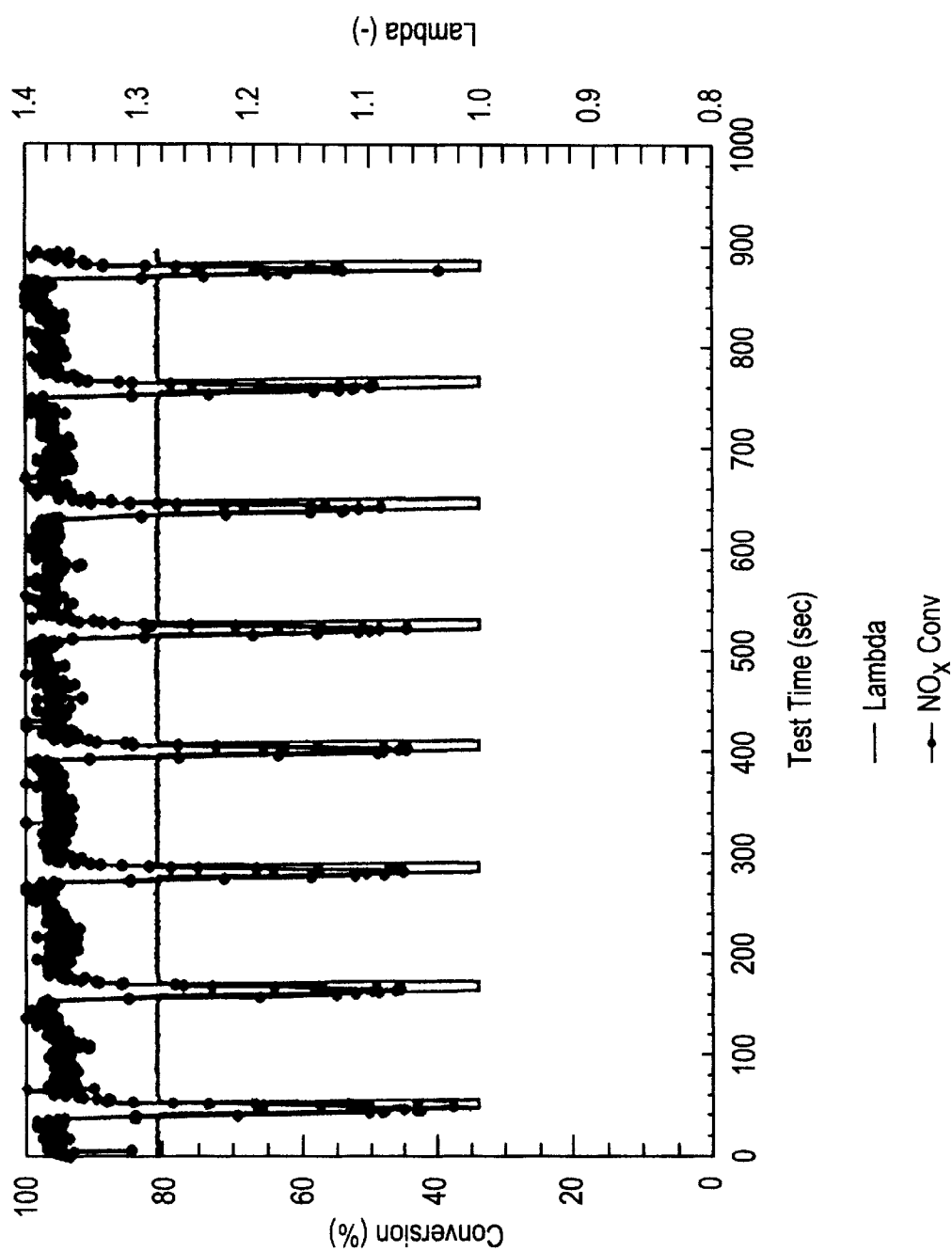
FIG. 9 illustrates NOx conversion for inventive example, I-3.

The invention was simulated as in example I-2, but with a 10 second injection of propylene. Because of a limitation in measuring high hydrocarbon concentration at the inlet of the adsorption means, the A/F ratio at the adsorption means inlet was only $\lambda\approx0.99$. The test cycle was repeated continuously for over 15 minutes. A segment of the test is shown in FIG. 9. During the regeneration period, there was insufficient reductant available at $\lambda\approx0.99$ so NOx is not completely reduced to $N_2$.

INVENTIVE EXAMPLE, I-4

Figure 10:
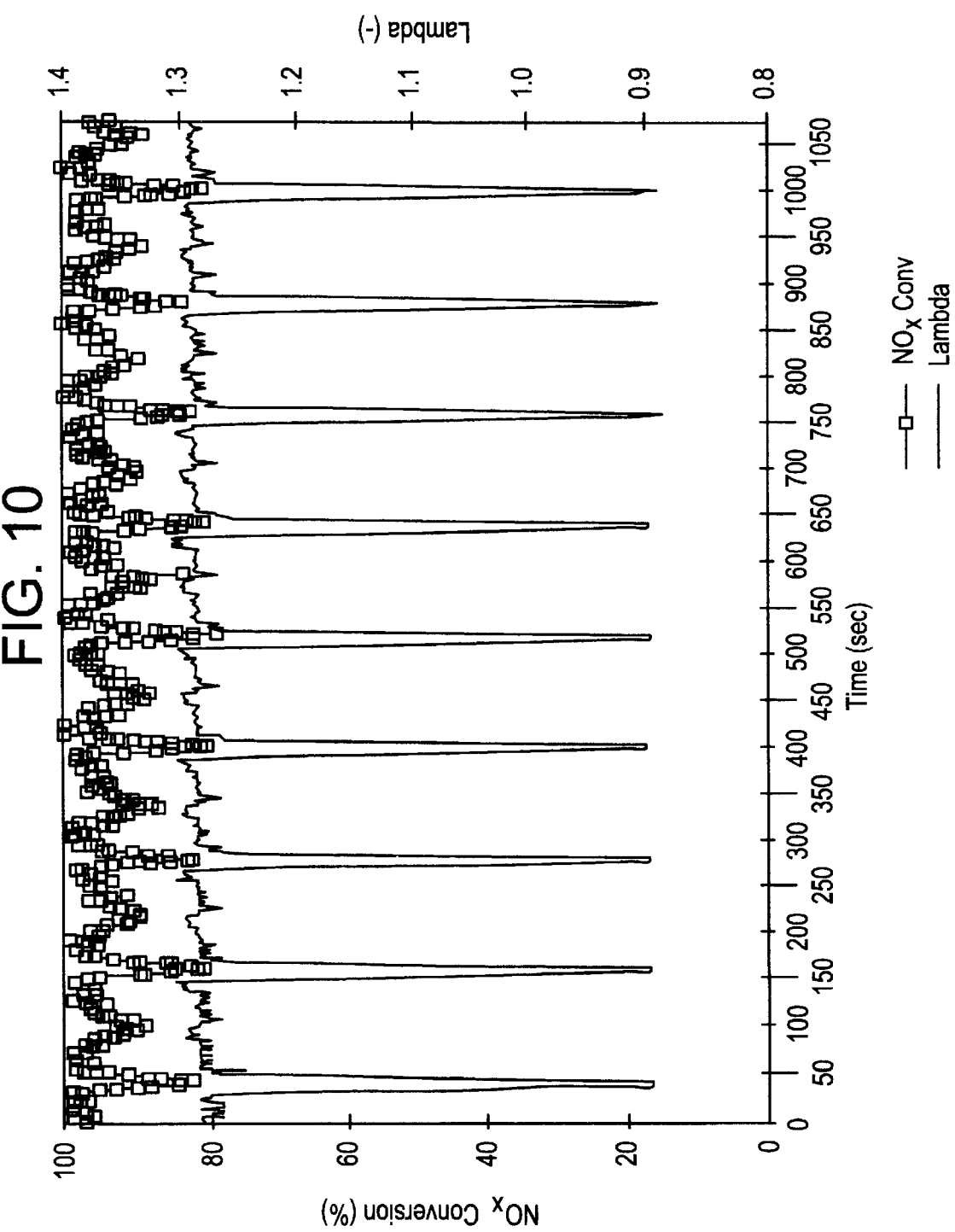
FIG. 10 illustrates NOx conversion for inventive example, I-4.

The invention was simulated as in example I-3, but with the A/F ratio at the adsorption means decreased to $\lambda\approx0.90$ A segment of the test is shown in FIG. 10. Referring to FIG. 10, it is quite apparent that consistent NOx conversion is achieved throughout the test. NOx conversion does not decrease below 80% in contrast to the previous experiments.

Also, the average NOx conversion for the test is approximately 94.2%. This is quite an accomplishment for an engine running at $\lambda\approx1.3$.

In considering the teachings of Inventive Examples, I-1 to I-4, it is apparent that with the proper choice and amount of reductant, extremely high NOx conversion rates upwards of 90 percent and higher are achievable under engine operating conditions (i.e., lean operating conditions) corresponding to $\lambda\approx1.3$. For example, example I-2 shows that a 10 second CO pulse does not fully regenerate the adsorption means and therefore a sharp reduction in NOx conversion is observed when compared with example I-1. Example I-3 shows that with propylene as reductant, the adsorbent means regenerates but there is insufficient reductant to reduce the NOx as NOx breakthrough spikes are observed during the time when reductant is added. Example I-4 shows sufficient reductant is supplied to regenerate and reduce the NOx as there are no observed NOx breakthrough spikes during the reductant injection phase.

In comparing Comparative Example, C-2 to Inventive Example, I-4, it is observed that example I-4 gives comparable NOx conversion (>90%). However, example I-4 is able to provide this performance with a substantially lower consumption of reductant. Specifically, based on 10 second reductant injection periods, example C-2 requires approximately 8.06 grams of reductant to achieve approximately 98% NOx conversion while example I-2 only requires approximately 2.02 grams of reductant to achieve approximately 94% NOx conversion. Thus, only approximately 25% of the reductant used in example C-2 is needed in example I-4 to achieve a comparable NOx conversion.

Furthermore, it has been observed that regeneration of the adsorption means should occur shortly after switched to the low-flow condition. In this way, the adsorption means can be regenerated and ready to switch to the high-flow adsorption mode as required. Otherwise, injection at a time distant from the low-flow mode (regeneration) changeover complicates the control as anticipation of the drive cycle is required.

While specific embodiments of the present invention are described in detail herein, they are illustrative in nature, and the scope of the present invention is defined in the claims that follow. Modifications to the illustrated embodiments will occur to those skilled in the art upon a reading of the accompanying disclosure. Such modifications are also intended to be included within the scope of the accompanying claims.

What is claimed is:

1. An apparatus for the concentration and abatement of adsorbable pollutants contained in gaseous streams comprising:

(a) an inlet conduit for receiving gases;

(b) a single means for controlling the gases from said inlet conduit and dividing such gases into a high flow stream comprising 70–99% of such gases and a low flow stream comprising 1–30% of such gases between at least a first conduit and a second conduit;

(c) a first pollutant adsorption means in fluid communication with said first conduit, said first pollutant adsorption means having inlet and outlet conduits, said first pollutant adsorption means comprising: (i) an adsorbent selected from the group consisting of metal oxides, metal hydroxides and mixed metal oxides, (ii) catalytically effective amounts of a metal selected from the group consisting of Pt, Pd, Rh and mixtures of such metals and (iii) means to inject a reductant into the first pollutant adsorption means;

(d) a heating source for heating the first pollutant adsorption means to temperatures sufficient to desorb the adsorbed pollutants;

(e) a second pollutant adsorption means in fluid communication with said second conduit, said second pollutant adsorption means having inlet and outlet conduits, said second pollutant adsorption means comprising: (i) an adsorbent selected from the group consisting of metal oxides, metal hydroxides and mixed metal oxides, (ii) catalytically effective amounts of a metal selected from the group consisting of Pt, Pd, Rh and mixtures of such metals and (iii) means to inject a reductant into the second pollutant adsorption means; and (f) a heating source for heating the first and second pollutant adsorption means to temperatures sufficient to desorb the adsorbed pollutants.

2. The apparatus of claim 1, wherein the metal is selected from the group consisting of Group IA and Group IIA metals, lanthanum and manganese.

3. The apparatus of claim 1, wherein the adsorbent is selected from the group consisting of SrO, BaO, CaO, $BaTiO_3$, $BaZrO_3$, $LaZrO_2$, $MnO_2$, $LaMnO_{x'}$, and mixtures of $La_2O_3$ and $CeO_2$ with $TiO_2$ and $ZrO_2$ and where x' is an integer from 2 to 4.

4. The apparatus of claim 1, wherein the adsorbent is strontium oxide, barium oxide, or mixtures thereof.

5. The apparatus of claim 4, wherein the adsorbent contains an absorbency enhancing effective amount of platinum.

6. The apparatus of claim 1, where the metal is selected from the group of mixtures of Pt and Rh and mixtures of Pt, Rh and Pd.

7. The apparatus of claim 1, wherein the position of the metal relative to the adsorbent is an overlayer, as an underlayer, as separately provided behind the adsorbent, or as a homogenous mixture of adsorbent and metal.

8. The apparatus of claim 1 used in treating gaseous streams emanating from gasoline or diesel engines.

9. The apparatus of claim 1, wherein the single means comprises a movable and controllable semicircular slide.

10. The apparatus of claim 1, wherein the single means comprises a movable and controllable semicircular globe.

11. A method for concentrating and abating adsorbable pollutants contained in a gaseous stream comprising the steps of (a) receiving such stream;

(b) providing a single a single means for dividing said gaseous stream into a high flow stream comprising 70–99% of such gases and a low flow stream comprising 1–30% of such gases;

(c) periodically flowing said high flow stream and said low flow stream in an alternating manner into a first pollutant adsorption means comprising: (i) an adsorbent selected from the group consisting of metal oxides, metal hydroxides and mixed metal oxides, (ii) catalytically effective amounts of a metal selected from the group consisting of Pt, Pd, Rh and mixtures of such metals and (iii) means to inject a reductant into the first pollutant adsorption means;

(d) periodically flowing said high flow stream and said low flow stream in an alternating manner into a second pollutant adsorption means comprising: (i) an adsorbent selected from the group consisting of metal oxides, metal hydroxides and mixed metal oxides, (ii) catalytically effective amounts of a metal selected from the group consisting of Pt, Pd, Rh and mixtures of such metals and (iii) means to inject a reductant into the pollutant adsorption means;

(e) adsorbing and abating the pollutants present in said high flow stream and low flow stream in said first and second pollution adsorption means and permitting the resultant streams to exit said first and second pollutant adsorption means;

(f) periodically regenerating said first and second pollutant adsorption means in an alternating manner by desorption of the absorbents by injection of the reductant into the first and second pollutant adsorption means and by supplying heat to the first and second pollutant adsorption means to heat such means to temperatures sufficient to desorb the means; and (g) periodically cycling the adsorption and abatement, and regenerating functions of steps (e) and (f) between said first and second adsorption means.

12. The method of claim 11, wherein the pollutants are oxides of nitrogen or sulfur.

13. The method of claim 11, wherein the single means comprises a movable and controllable semicircular slide.

14. The method of claim 11, wherein the single means comprises a movable and controllable semicircular globe.

15. A system for the concentration and abatement of adsorbable pollutants in a gas stream which comprises:

(a) an engine which generates such gas stream and emits such gas stream through an exhaust;

(b) an inlet conduit in communication with the engine exhaust;

(c) a single means for dividing such gas stream into a high flow stream comprising 70–99% of the gases and a low flow stream comprising 1–30% of the gases between at least a first conduit and a second conduit in communication with the inlet conduit;

(d) a first pollutant adsorption means in fluid communication with said first conduit, said first pollutant adsorption means having inlet and outlet conduits, said first pollutant adsorption means comprising: (i) an adsorbent selected from the group consisting of metal oxides, metal hydroxides and mixed metal oxides, (ii) catalytically effective amounts of a metal selected from the group consisting of Pt, Pd, Rh and mixtures of such metals and (iii) means to inject a reductant into the first pollutant adsorption means;

(e) a heating source for heating the first pollutant adsorption means to temperatures sufficient desorb the adsorbed pollutants;

(f) a second pollutant adsorption means in fluid communication with said second conduit, said second pollutant adsorption means having inlet and outlet conduits, said second pollutant adsorption means comprising: (i) an adsorbent selected from the group consisting of metal oxides, metal hydroxides and mixed metal oxides, (ii) catalytically effective amounts of a metal selected from the group consisting of Pt, Pd, Rh and mixtures of such metals and (iii) means to inject a reductant into the second pollutant adsorption means; and (g) a heating source for heating the first and second pollutant adsorption means to temperatures sufficient to desorb the adsorbed pollutants.

16. The system of claim 15, wherein the pollutants are oxides of nitrogen or sulfur.

17. The system of claim 15, wherein the single means comprises a movable and controllable semicircular slide.

18. The system of claim 15, wherein the single means comprises a movable and controllable semicircular globe.

* * * * *